US006799013B2

(12) United States Patent
Shin

(10) Patent No.: US 6,799,013 B2
(45) Date of Patent: Sep. 28, 2004

(54) PAPER DISCHARGING DEVICE OF IMAGE FORMING APPARATUS AND METHOD THEREOF

(75) Inventor: Hwa-sung Shin, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 40 days.

(21) Appl. No.: 10/139,246

(22) Filed: May 7, 2002

(65) Prior Publication Data

US 2003/0059239 A1 Mar. 27, 2003

(30) Foreign Application Priority Data

Sep. 26, 2001 (KR) ........................................ 2001-59498

(51) Int. Cl.[7] ........................ G03G 15/00; B65H 29/46; B65G 57/00

(52) U.S. Cl. ........................ 399/405; 271/84; 414/791.2

(58) Field of Search ................................ 399/404, 405; 271/84, 207, 314; 414/791.2

(56) References Cited

U.S. PATENT DOCUMENTS 4,480,825 A * 11/1984 Landa .................... 271/207 X
5,088,721 A * 2/1992 Suzuki et al. ........... 271/207 X
5,335,904 A * 8/1994 Ryuzaki ...................... 271/272
5,489,092 A * 2/1996 Kimura et al. ....... 414/791.2 X
5,618,035 A * 4/1997 Coombs et al. ...... 414/791.2 X
6,581,930 B2 * 6/2003 Kim ....................... 271/207 X

* cited by examiner

*Primary Examiner*—Fred Braun
(74) *Attorney, Agent, or Firm*—Staas & Halsey LLP

(57) ABSTRACT

A method and device for discharging paper, the paper discharging device having a rotary shaft rotating by a driving source, a hollow shaft into which the rotary shaft is slidably inserted, the hollow shaft rotating with the rotary shaft and reciprocating on the rotary shaft, a driving shaft disposed at a predetermined distance from and parallel to the rotary shaft to rotate with the rotary shaft, a driven gear rotatably disposed at the driving shaft and engaging a driving gear on an end of the rotary shaft, an electrical clutch selectively transmitting rotation power of the driven gear to the driving shaft, and a reciprocating portion reciprocating the hollow shaft according to rotation of the driving shaft. The paper is discharged in an oblique, rightward, or leftward direction with respect to a discharging direction due to the reciprocal movement of the hollow shaft, thereby stacking the paper on a stacker in a zigzag fashion.

48 Claims, 6 Drawing Sheets

PAPER DISCHARGING DEVICE OF IMAGE FORMING APPARATUS AND METHOD THEREOF

CROSS-REFERENCE TO RELATED APPLICATIONS

This application claims the benefit of Korean No. 2001-59498, filed Sep. 26, 2001, in the Korean Industrial Property office, the disclosure of which is incorporated herein by reference.

BACKGROUND OF THE INVENTION

1. Field of the Invention

The present invention relates to an image forming apparatus, such as a laser printer, and more particularly, to a paper discharging device of an image forming apparatus discharging printed sheets of paper in a zigzag fashion.

2. Description of the Related Art

A laser printer is one of typical image forming apparatuses that are mainly connected to a network or a computer to print desired information page by page. Compared to a dot printer or an inkjet printer, the laser printer uses an electrophotography printing method by which the laser printer projects a laser beam to an electrically charged photosensitive mechanism, forms an electrostatic latent image, develops the electrostatic latent image to a visible image by toner particles, and transfers and fixes the developed visible image on printing paper.

Generally, the laser printer comprises a paper cassette, a developing unit, a stacker, and a discharging unit.

In the laser printer, paper picked-up from the paper cassette is supplied to the developing unit. After being printed in the developing unit, the paper passes through the discharging unit and is stacked on the stacker.

The paper that is printing-finished through a series of the above-described processes is stacked in the stacker in printing order. Conventionally, the laser printer continuously discharges all sheets of the paper to the same position of the stacker. Therefore, there is a problem in that a user is required to classify the sheets of the paper one by one. Also, when the user prints the same image on a number of sheets, it is more disadvantageous for the user to classify all of the sheets one by one. Therefore, there is inconvenience in directly and additionally classifying all of the sheets manually one by one and also there is a loss of time.

SUMMARY OF THE INVENTION

The present invention is developed in order to solve the above problems, and an object of the present invention is to provide a paper discharging device of an image forming apparatus capable of more simply and economically discharging printing paper in a zigzag fashion.

Additional objects and advantageous of the invention will be set forth in part in the description which follows and, in part, will be obvious from the description, or may be learned by practice of the invention.

The above and other objects are accomplished by providing a paper discharging device comprising a rotary shaft rotating by a driving power of a driving source, a hollow shaft into which the rotary shaft is slidably inserted, the hollow shaft rotating in association with the rotary shaft and reciprocating along the rotary shaft, a driving shaft disposed at a predetermined distance from and in parallel to the rotary shaft to rotate in association with the rotary shaft, a driving gear installed on an end of the rotary shaft, a driven gear rotatably disposed at the driving shaft and engaged with the driving gear, an electrical clutch selectively transmitting the rotating force of the driven gear to the driving shaft, and a reciprocating unit reciprocating the hollow shaft in accordance with a rotation of the driving shaft.

Meanwhile, the paper discharging device further comprises a holding cam disposed at an end of the driving shaft, a pivoting lever pressingly contacting the holding cam to restrict a rotation of the driving shaft, and a spring biasing the pivoting lever toward the holding cam, and a reciprocating unit detecting the rotation of the driving shaft.

The reciprocating unit comprises a guide block connected to an end of the hollow shaft and connected to a guide rail at a lower side thereof, the guide block reciprocating along the guide rail so as to reciprocate the hollow shaft along the rotary shaft, a guide cam disposed at the driving shaft and having a spiral guide groove formed on an outer circumference thereof, and a guide lever with one end hinged to an upper surface of the guide block and with the other end inserted into the guide groove.

The detecting unit comprises a photo sensor and a sensing lever coaxially combined with the pivoting lever and rotating bilaterally in association with the pivoting lever so as to selectively block and permit transmission of light which is transmitted from a light emitting portion of the photo sensor to a light receiving portion of the photo sensor.

According to the paper discharging device, by the reciprocal movement of the hollow shaft connected to a rotary roller, paper is discharged obliquely toward a left portion or a right portion of a stacker to be discharged one by one in a zigzag fashion.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
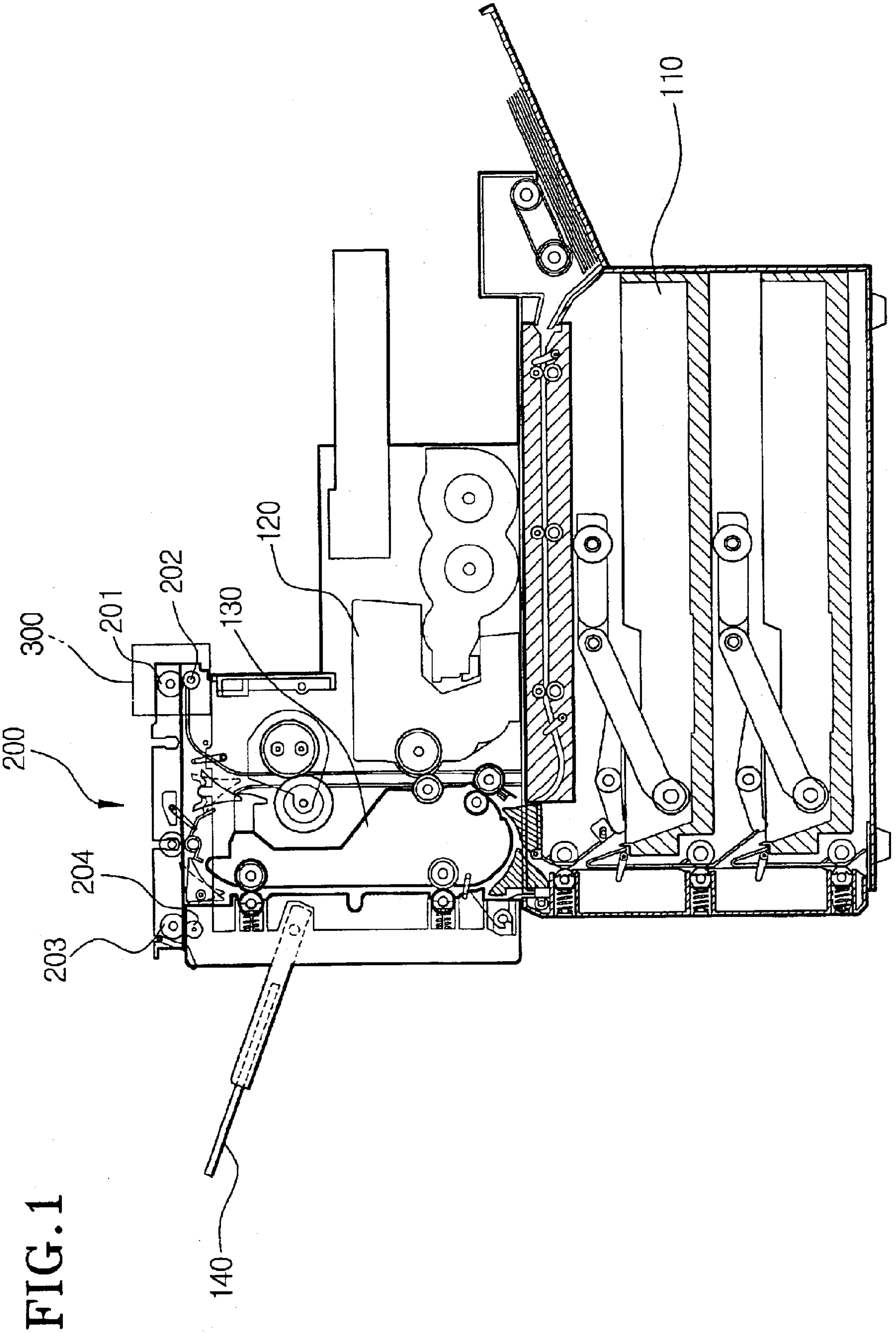
FIG. 1 is a schematic sectional side view showing a laser printer having a duplex printing unit according to an embodiment of the present invention.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Hereinafter, an embodiment of a paper discharging device according to the present invention will be described in greater detail by referring to the accompanying drawings.

FIG. 1 shows a laser printer having a duplex printing unit built therein. As shown in FIG. 1, the laser printer comprises a paper cassette 110, a developing unit 120, a duplex printing unit 130, a stacker 140, a discharging unit 200, and a paper discharging device 300 discharging paper in a zigzag fashion.

The paper picked up from the paper cassette 110 is supplied to the developing unit 120. After being printed in the developing unit 120, the paper passes through the discharging unit 200 and then is stacked on the stacker 140. Meanwhile, in a duplex printing operation, the paper, one side of which is printed in the developing unit 120, is transferred from the discharging unit 200 to the duplex printing unit 130 and then is returned to the developing unit 120 after passing through a predetermined paper circling passage formed in the duplex printing unit 130. The paper being returned to the developing unit 120 is printed on a non-printed side of the paper opposite of the one side, passes through the discharging unit 200, and then is stacked on the stacker 140.

In the discharging unit 200 are provided a plurality of transferring rollers 203 and backup rollers 204 which are disposed oppositely to each other. Due to the rotary driving force of the transferring rollers 203 and the backup rollers 204, the paper is transferred in a predetermined discharging direction. At this point, the reference numerals 201 and 202 indicate discharging rollers and the backup rollers that are controlled to be capable of drivingly rotating in both clockwise and counterclockwise directions according to the predetermined discharging direction. The transferring rollers 203 and the discharging rollers 201 rotate by a driving motor (not shown). Meanwhile, the reference numeral 300 indicates a discharging device disposed opposite to the stacker 140.

Figure 2:
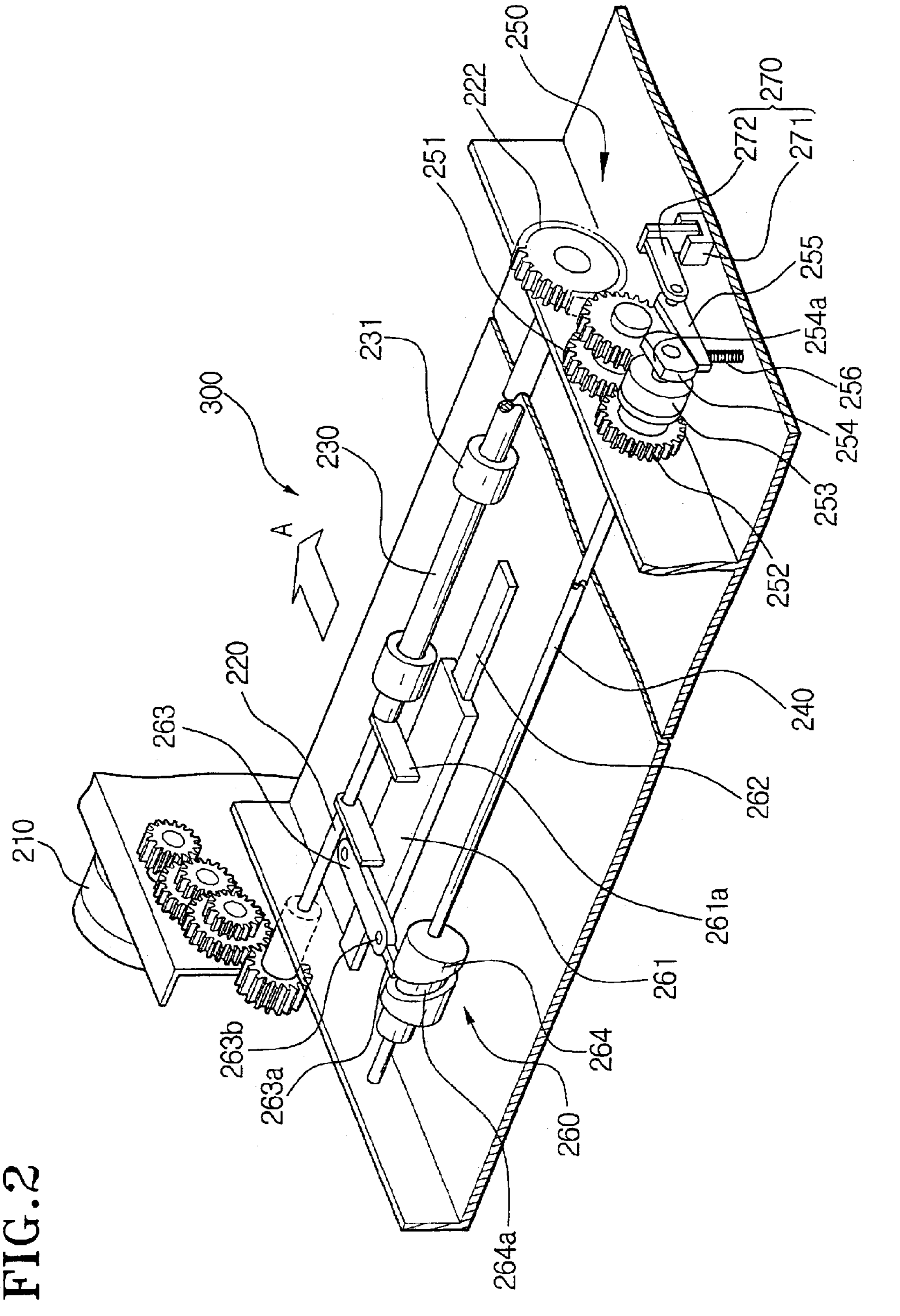
FIG. 2 is a schematic perspective view showing a paper discharging device of the laser printer of FIG. 1.

As shown in FIG. 2, in this embodiment, the paper discharging device 300 is mounted on the discharging unit 200 of FIG. 1 and comprises a rotary shaft 220 rotating by a driving power from a driving source, such as a motor 210, provided in a printer body, a hollow shaft 230 enclosing an external circumference of the rotary shaft 220, a driving shaft 240 selectively or intermittently rotating in association with the rotary shaft 220, a clutch portion 250 selectively connecting the rotary shaft 220 to the driving shaft 240, and a reciprocating portion 260 reciprocating the hollow shaft 230 on the rotary shaft 220 according to a rotation of the driving shaft 240.

On an external circumference of the hollow shaft 230 are disposed a plurality of rotary rollers 231. The rotary rollers 231 may be either the transferring rollers 203 or the discharging rollers 201 of FIG. 1, but in this embodiment, the rotary rollers 231 correspond to the discharging rollers 201 of FIG. 1. Meanwhile, a plurality of backup rollers 202 are disposed at a lower portion of the rotary rollers 231 to be pressed against the rotary rollers 231.

Figure 3:
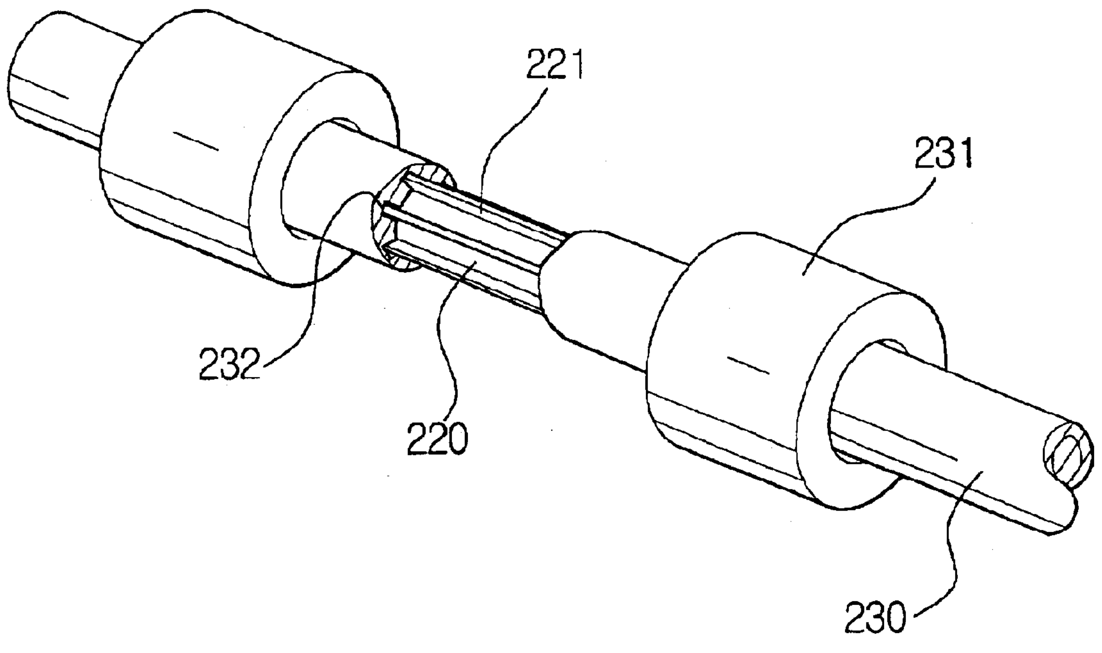
FIG. 3 is a partially cut perspective view showing a hollow shaft of the paper discharging device of FIG. 2.

As shown in FIG. 3, on an inner circumference of the hollow shaft 230 are provided a plurality of guide slits 232, and on an outer circumference of the rotary shaft 220 are provided a plurality of rails 221 corresponding to the guide slits 232.

When the rotary shaft 220 rotates by the driving power generated from the motor 210, the hollow shaft 230 rotates due to both the rails 221 and the guide slits 232 being engaged with each other. According to a rotation of the hollow shaft 230, the rotary rollers 231 and the backup rollers 202 rotate while engaged with each other so as to discharge printed paper toward the stacker 140 in a discharging direction "A". Meanwhile, the hollow shaft 230 rotates in association with the rotary shaft 220 as described above and also reciprocates on the rotary shaft 220 by the guide slits 232 sliding on the rails 221 when the hollow shaft 230 is subjected to a force in an axial direction of the hollow shaft 230 and the rotary shaft 220 due to a guide block 261 (See FIG. 2).

Meanwhile, as shown in FIG. 2, the clutch portion 250 comprises a driven gear 252 connected to a driving gear 222, which is installed on an end of the rotary shaft 220, via a plurality of idle gears 251, an electrical clutch 253 selectively transmitting a rotation power of the driven gear 252 to the driving shaft 240, and a holding cam 254 disposed at the driving shaft 240 to be parallel to the driven gear 252 and the electrical clutch 253.

As generally known, the electrical clutch 253 includes an armature and a rotor (not shown). The armature has a bearing so as to rotate on the driving shaft 240, and the rotor rotates integrally with the driving shaft 240. Since the armature and the rotor are separated from each other when the electrical clutch 253 is in an off position, the rotor and the driving shaft 240 do not rotate even if the armature rotates. On the other hand, since the armature and the rotor are in contact with each other when the electrical clutch 253 is in an on position, the rotor and the driving shaft 240 rotate when the armature rotates.

The driven gear 252 is directly connected to the armature of the electrical clutch 253 so as to rotate on the driving shaft 240. Meanwhile, the driven gear 252 is kept in connection with the driving gear 222 via the idle gears 251, thereby being kept rotating in association with the driving gear 222.

The holding cam 254 is integrally connected to an end of the driving shaft 240. The holding cam 254 is in a shape of a wheel having a pair of cutaway surfaces 254*a* that are symmetrical with each other with respect to a rotational axis thereof.

At a lower portion of the holding cam 254, a pivoting lever 255 is pivotably disposed to restrict a rotation of the holding cam 254. The pivoting lever 255 is biased toward the holding cam 254 by a spring 256. A top surface of the pivoting lever 255 pressingly contacts with the cutaway surface 254*a* of the holding cam 254 to restrict the rotation of the holding cam 254 when the electrical clutch 253 is in the off position. That is, when the electrical clutch 253 is in the off position, the pivoting lever 255 restrains the holding cam 254 from rotating, thereby preventing the hollow shaft 230 from moving horizontally even under a load and an external force during the rotation of the rotary rollers 231.

Meanwhile, the reference numeral 270 indicates a sensing portion for sensing the rotation of the driving shaft 240. The sensing portion 270 includes a photo sensor 271 and a sensing lever 272. The sensing lever 272 is coaxially combined with the pivoting lever 255. The sensing lever 272 rotates bilaterally in association with the pivoting lever 255 so as to selectively block transmission of light from a light emitting portion of the photo sensor 271 to a light receiving portion of the photo sensor 271.

Figure 4A:
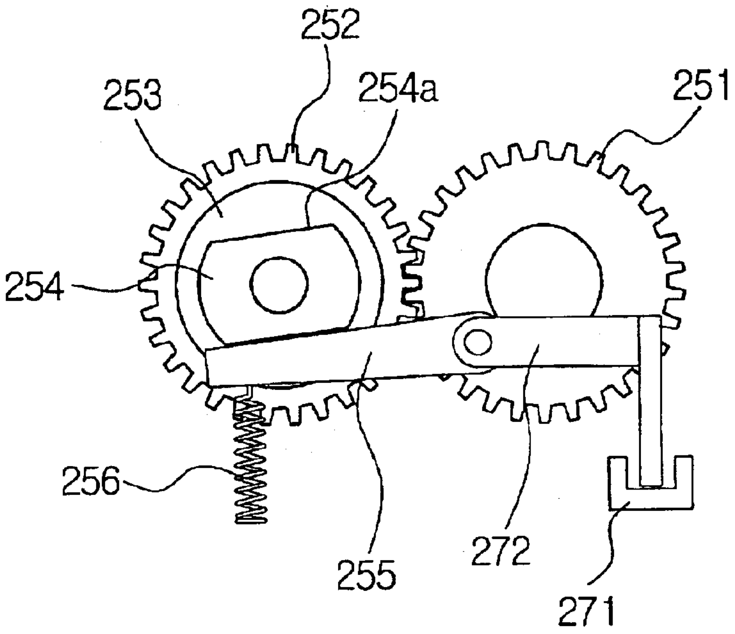
FIGS. 4A and 4B are partial side views showing a clutch portion of the paper discharging device of FIG. 2.

When the electrical clutch 253 is in the off position as shown in FIG. 4A, the rotation power of the driven gear 252 is not transmitted to the driving shaft 240 such that the driving shaft 240 does not rotate, while the driven gear 252 rotates idly in association with the driving gear 222 and the idle gear 251. Also, the pivoting lever 255 being in contact with a cutaway surface 254*a* of the holding cam 254 is pressed toward the holding cam 254 by the spring 256, thereby restraining the holding cam 254 and the driving shaft 240 from rotating. Meanwhile, the light from the light emitting portion of the photo sensor 271 to the light receiving portion of the photo sensor 271 is blocked by the sensing lever 272.

Figure 4B:
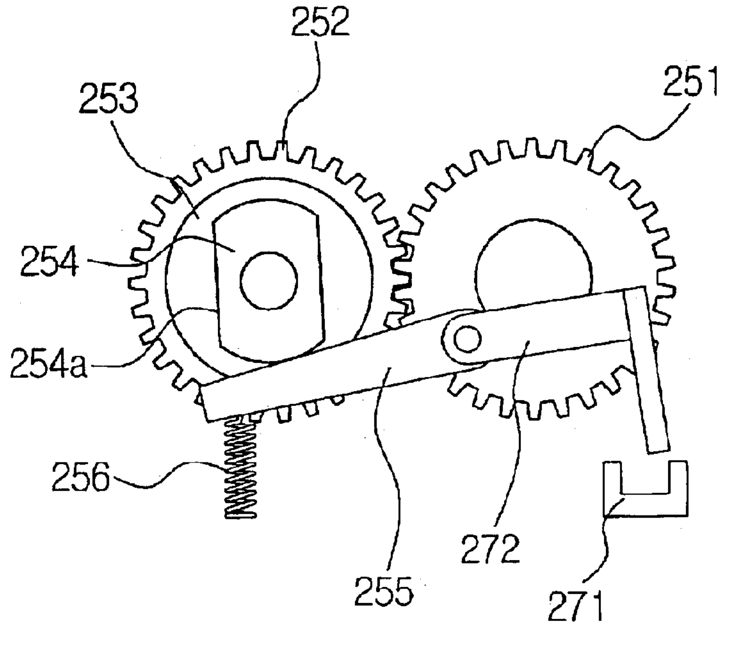

When the electrical clutch 253 is in the on position as shown in FIG. 4B, the rotation power of the driven gear 252 is transmitted to the driving shaft 240 such that the driving shaft 240 and the holding cam 254 rotate. At this point, the pivoting lever 255 pivots downwardly and the spring 256 is compressed. The spring 256 is maximally compressed when the holding cam 254 rotates by 90°, i.e., by a quarter of one rotation. Meanwhile, the sensing lever 272 pivots upwardly, i.e., oppositely to a pivoting direction of the pivoting lever 255 such that the light is transmitted from the light emitting portion to the light receiving portion to operate the photo sensor 271. Accordingly, the photo sensor 271 senses rotations of the driving shaft 240 and the holding cam 254 and outputs a rotation signal to a control portion (not shown). The control portion turns the electrical clutch 253 off according to the output signal from the photo sensor 271.

In the state of FIG. 4B, when the electrical clutch 253 is turned off, the transmission of the driving power from the driven gear 252 to the driving shaft 240 is blocked. However, the pivoting lever 255 pivots upwardly due to an elastic recovering force of the spring 256, thereby compressing the holding cam 254 and further rotating the holding cam 254 by 90° until the opposite cutaway surface 254*a* contacts the pivoting lever 255.

As described above, when the electrical clutch 253 is turned on, the driving shaft 240 and the holding cam 254 rotate by 180°, i.e., by a half of one rotation.

As shown in FIG. 2, the reciprocating portion 260 comprises a guide block 261 connected to an end of the hollow shaft 230 and slidably disposed on a guide rail 262 installed in a printer body, a guide cam 264 connected to the driving shaft 240 and having a spiral guide groove 264*a* at an external circumference thereof, a guide lever 263 with one end being hinged to an upper surface of the guide block 261 and with the other end, and a guide protrusion 263*a* formed on another end of the guide lever 263 and inserted into the guide groove 264*a* of the guide cam 264.

The guide lever 263 is installed in the printer body and is capable of pivoting on a pivot shaft 263*b* of a center portion. The hollow shaft 230 is pivotably connected to a bracket 261*a* at an end thereof. The bracket 261 is formed on an upper surface of the guide block 261. When the guide cam 264 performs one rotation, the guide lever 263 pivots on the pivot shaft 263*b* with the guide protrusion 263*a* moving along the guide groove 264*a* from a start position to an end position and then returns to the start position from the end position.

Figure 5A:
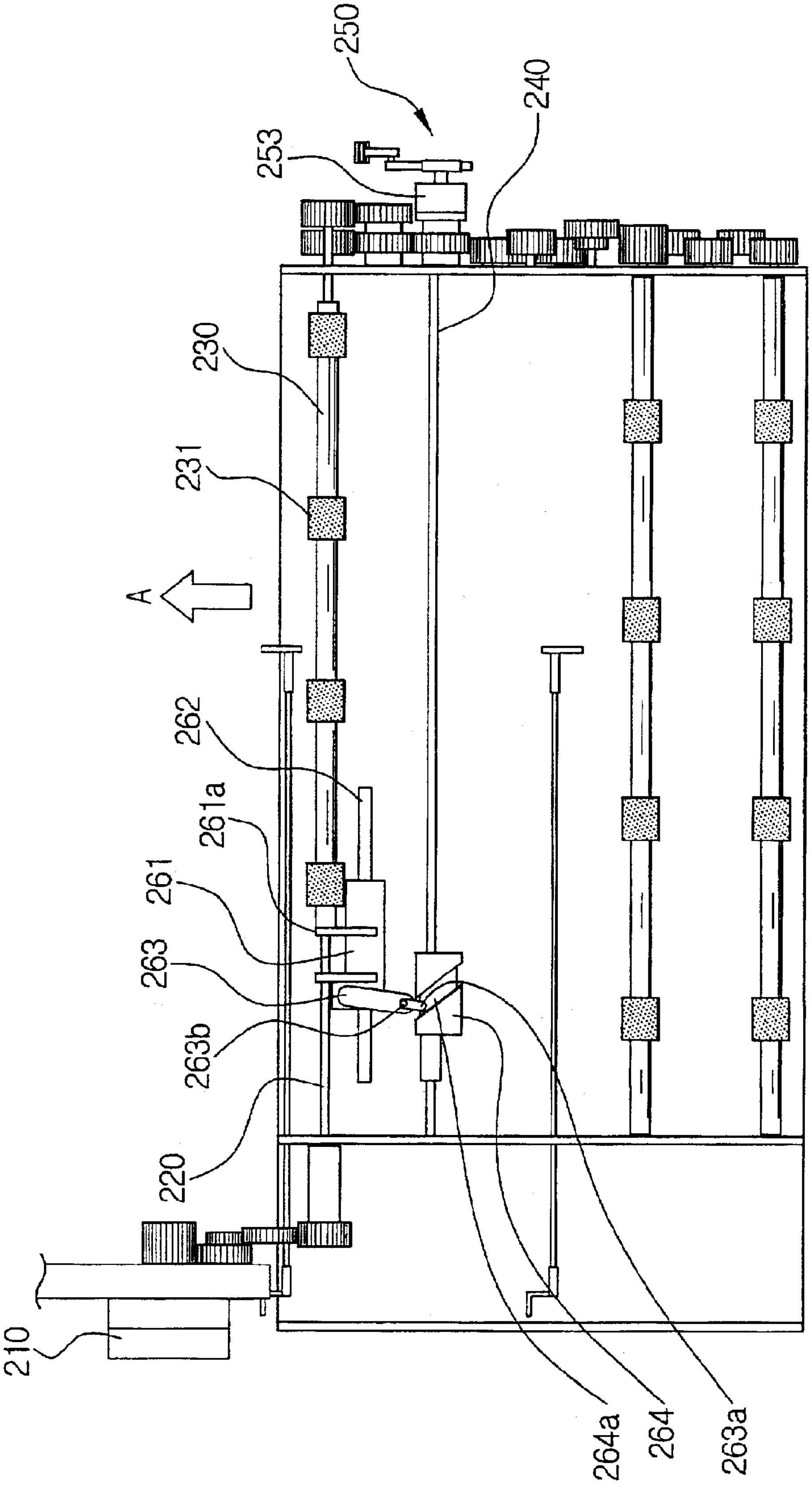
FIGS. 5A and 5B are plan views illustrating an operation of the paper discharging device of FIG. 2.

FIG. 5A shows an initial state where the driving shaft 240 does not rotate. As shown in FIG. 5A, the printed paper is discharged in a rightward direction oblique to a discharging direction "A" when the driving shaft 240 does not rotate.

At this point, when the electrical clutch 253 is in the on position and the driving shaft 240 rotates, the guide cam 264 rotates in association with the driving shaft 240. When the guide cam 264 rotates, the guide lever 263 pivots on the pivot shaft 263*b*. Due to the pivotal movement of the guide lever 263, the guide block 261 moves leftward in FIG. 5A and the hollow shaft 230 connected to the bracket 261*a* of the guide block 261 moves leftward while rotating in association with the rotary shaft 220.

Figure 5B:
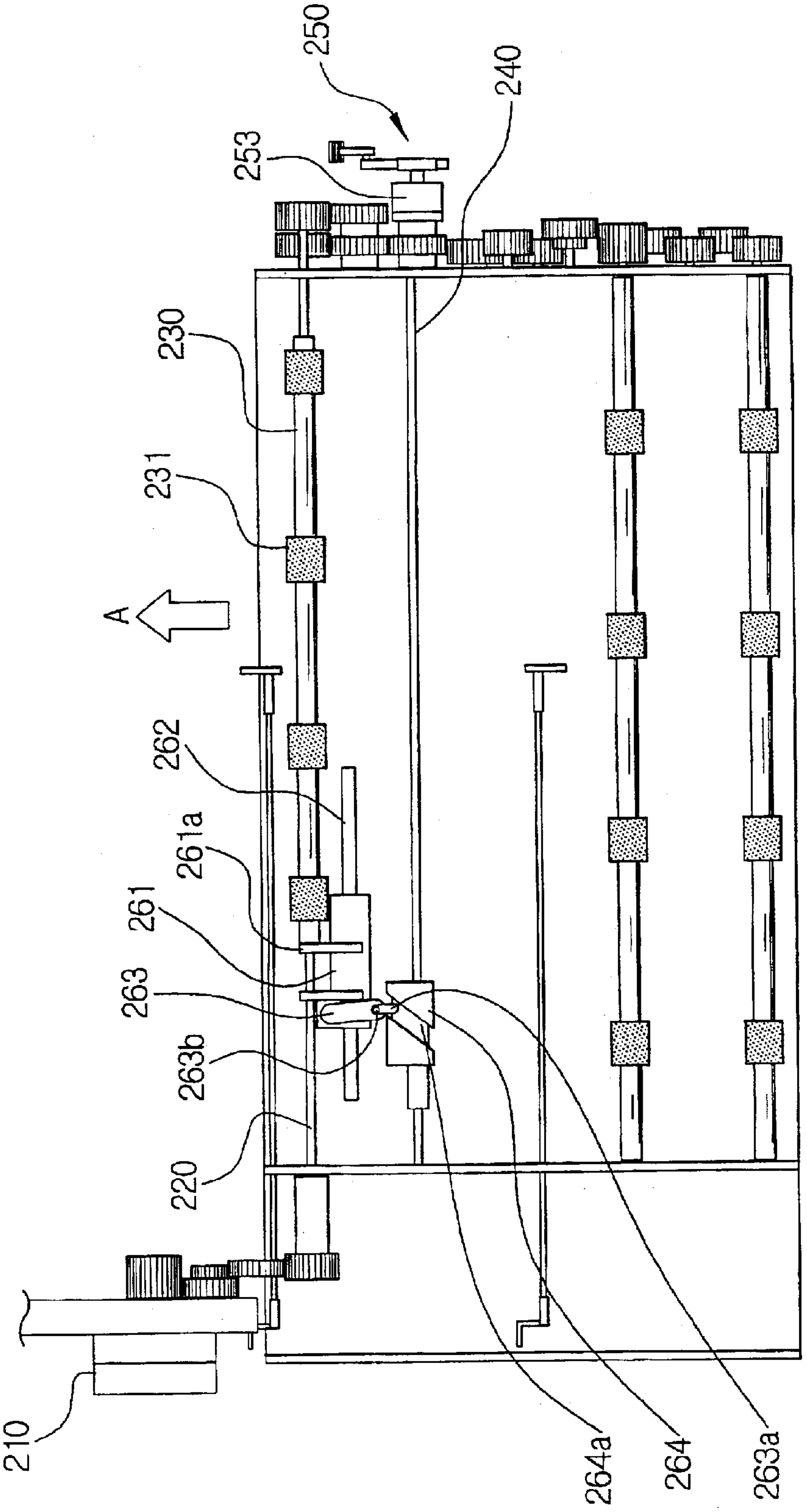

FIG. 5B shows an end state where the driving shaft 240 rotates by 180° from the initial state of FIG. 5A. As shown in FIG. 5B, when the driving shaft 240 rotates by 180°, the hollow shaft 230 moves leftward such that the printed paper is discharged in a leftward oblique relation to the discharging direction "A". Meanwhile, as described above, the electrical clutch 253 is turned off when the driving shaft rotates by 90°.

In the state of FIG. 5B, when the electrical clutch 253 is turned on, the driving shaft 240 rotates by 180° to return the hollow shaft 230 to the initial state of FIG. 5A. Due to the reciprocal movement of the hollow shaft 230, the paper is discharged in the rightward or leftward oblique relation to the discharging direction "A", thereby being stacked on the stacker 140 of FIG. 1 in a zigzag fashion.

As described above, according to the paper discharging device of the present invention, the paper is discharged in the rightward or leftward direction of the stacker or in an oblique direction to the discharging direction "A" due to the reciprocal movement of the hollow shaft 230 connected to the rotary rollers 231, thereby being stacked on the stacker 140 in the so-called zigzag fashion. Accordingly, the inconvenience that requires the user to directly classify the paper manually can be solved.

Also, according to the paper discharging device of the present invention, since the rotation power of the rotary shaft 220 is selectively transmitted to the driving shaft 240 by the electrical clutch 253 without moving the driven gear 252 in an axial direction, the transmission of the rotation power can be smoothly accomplished and the damages to the various kinds of gears can be prevented.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A paper discharging device in an image forming apparatus, comprising:

a driving source;

a rotary shaft rotating by the driving source;

a hollow shaft into which the rotary shaft is slidably inserted, rotating in association with the rotary shaft and reciprocating on the rotary shaft;

a driving shaft disposed at a predetermined distance from and in parallel to the rotary shaft, rotating in association with the rotary shaft;

a driving gear installed on a end of the rotary shaft;

a driven gear rotatably disposed at the driving shaft and engaged with the driving gear;

an electrical clutch selectively transmitting a rotation power of the driven gear to the driving shaft; and a reciprocating portion reciprocating the hollow shaft in accordance with a rotation of the driving shaft.

2. The device f claim 1, further comprising:

a holding cam disposed at a end of the driving shaft;

a pivoting lever contacting the holding cam to restrict the rotation of the driving shaft; and a spring biasing the pivoting lever toward the holding cam.

3. The device of claim 2, wherein the holding cam is in a shape of a wheel having a pair of cutaway surfaces at pair of opposite sides symmetrical with respect to a rotational axis thereof.

4. The device of claim 2, further comprising a detector detecting the rotation of the driving shaft.

5. The device of claim 4, wherein the detector comprises:

a photo sensor having a light emitting portion emitting a light and a light receiving portion; and a sensing lever coaxially combined with the pivoting lever and rotating bilaterally in association with the pivoting lever so as to selectively block and permit transmission of light which is transmitted from the light emitting portion of the photo sensor to the light receiving portion of the photo sensor.

6. The device of claim 1, further comprising:

a guide slit formed in an inner circumference of the hollow shaft; and a rail formed on an outer circumference of the rotary shaft corresponding to the guide slit, whereby the hollow shaft rotates in association with the rotary shaft and reciprocates on the rotary shaft.

7. The device of claim 1, wherein the reciprocating portion comprises:

a guide block connected to the hollow shaft and connected to a guide rail at a lower side thereof, the guide block reciprocating along the guide rail so as to reciprocate the hollow shaft;

a guide cam disposed at the driving shaft and having a guide groove formed on an outer circumference thereof; and a guide lever with one end hinged to an upper surface of the guide block and with the other end inserted into the guide groove.

8. The device of claim 7, wherein the guide groove is formed in a spiral pattern.

9. The device of claim 1, further comprising a rotary roller contacting an outer circumference of the hollow shaft to feed a sheet of paper.

10. The device of claim 1, wherein the hollow shaft reciprocates on the rotary shaft such that sheets of paper printed by the image forming apparatus are discharged and automatically classified in a zigzag fashion.

11. A paper discharging device in an image forming apparatus, comprising:

a driving source;

a rotary shaft rotating by the driving source;

a reciprocating portion rotating in association with the rotary shaft, having a cam rotating together with the reciprocating portion; and a hollow shaft inserted around the rotary shaft, rotating by the rotary shaft, reciprocating along an axial axis of the rotary shaft in a first position and a second position in response to the cam of the reciprocating portion, and discharging a sheet in either a first direction or a second direction different from the first direction.

12. The device of claim 11, wherein the hollow shaft guides the sheet to be discharged in the first direction when simultaneously rotating around the rotary shaft and moving from the first position to the second position and in the second direction when simultaneously rotating around the rotary shaft and moving from the second position to the first position along the axial axis of the rotary shaft.

13. The device of claim 11, wherein the hollow shaft moves along the axial axis of the rotary shaft when the sheet is fed past the hollow shaft.

14. The device of claim 11, wherein the hollow shaft moves along the axial axis of the rotary shaft before the sheet is fed past the hollow shaft.

15. The device of claim 11, wherein the hollow shaft discharges sheets in a zigzag fashion when alternatively discharging the sheets one by one in the first direction and the second direction.

16. The device of claim 15, wherein the hollow shaft moves along the axial axis of the rotary shaft when each of the sheets is past the hollow shaft to be discharged.

17. The device of claim 15, wherein the hollow shaft moves along the axial axis of the rotary shaft when the sheets are not past the hollow shaft.

18. The device of claim 11, wherein the first direction and the second direction are oblique with respect to line perpendicular to the rotary shaft.

19. The device of claim 11, wherein one of the first direction and the second direction has an angle with respect to a line perpendicular to the rotary shaft.

20. The device of claim 11, wherein one of the first direction and the second direction is perpendicular to the axial axis of the rotary direction.

21. The device of claim 11, wherein the sheet is discharged in a third direction perpendicular to the axial axis of the rotary shaft when the hollow shaft does not move along the axial axis of the rotary shaft.

22. The device of claim 11, wherein the first direction and the second direction are on the same plane of the sheet to be discharged.

23. The device of claim 11, wherein the first direction is oblique at a positive angle to a central line of the sheet to be discharged while the second direction is oblique at a negative angle to the central line of the sheet to be discharged.

24. The device of claim 11, wherein the first position and the second position of the hollow shaft are on coaxial direction of the rotary shaft.

25. The device of claim 11, further comprising a roller rotating together with the hollow shaft, moving along the axial axis of the rotary shaft together with the hollow shaft, and feeding the sheet to be discharged in the first direction when moving from the first position to the second position and in the second direction when moving from the second position to the first position along the axial axis of the rotary shaft.

26. The device claim 11, wherein the reciprocating portion comprises a driving shaft selectively rotating in association with the rotary shaft, the cam formed around the driving shaft.

27. The device of claim 26, wherein the hollow shaft reciprocates by the cam of the driving shaft of the reciprocating portion.

28. The device of claim 26, wherein the driving shaft is parallel to the hollow shaft while the cam is disposed between the driving shaft and the hollow shaft.

29. The device of claim 26, further comprising a clutch portion disposed between the rotary shaft and the driving shaft to selectively connect the rotary shaft to the driving shaft.

30. The device of claim 29, wherein the clutch portion comprises:

a driving gear rotating by the rotary shaft;

a driven gear rotating by the driving gear; and a clutch selectively connecting the driven gear to the driving shaft.

31. The device of claim 30, further comprising:

a holding cam formed on the driving shaft;

a lever contacting the holding cam; and a spring biasing the lever against the holding cam.

32. The device of claim 31, further comprising a plurality of cutaway surfaces formed on opposite sides the holding cam, wherein the lever contacts one of the cutaway surfaces of the holding cam when the clutch does not connect the driven gear to the driving shaft.

33. The device claim 31, further comprising a sensor disposed to detect the lever contacting the one of the cutaway surfaces of the holding cam, wherein the sensor generates a signal controlling the rotary shaft to rotate and the reciprocating portion to reciprocate.

34. The device of claim 26, further comprising a guide disposed between the cam of the reciprocating portion and the hollow shaft to move the hollow shaft along the axial axis of the rotary shaft.

35. The device of claim 34, wherein the guide pivots to be engaged with the cam and the hollow shaft.

36. The device of claim 35, further comprising a guide rail and a guide block moving along the guide rail, wherein the guide is disposed on the guide block.

37. The device of claim 35, further comprising a guide groove formed on the cam wherein one end of the guide is coupled to the guide groove while another end of the guide is coupled to the hollow shaft.

38. A paper discharging device in an image forming apparatus, comprising:

a rotary shaft rotating by a driving source, having a rail formed on the rotary shaft along an axial direction;

a reciprocating portion rotating in association with the rotary shaft; and a hollow shaft having a slit formed on the hollow shaft along the axial direction, inserted around the rotary shaft when the rail of the rotary shaft slides into the slit of the hollow shaft, having a roller coaxially rotating in association with the rotary shaft to discharge a sheet in a discharging direction perpendicular to the rotary shaft, reciprocating in the axial direction along the rotary shaft in association with he reciprocating portion, and simultaneously rotating and reciprocating to change the discharging direction of the sheet to an oblique direction with respect to the discharging direction.

39. The device of claim 38, wherein the oblique direction and the discharging direction are on the same plane as the sheet.

40. A paper discharging device in an image forming apparatus, comprising:

a discharging unit feeding a sheet along a feeding path and discharging the sheet outside the image forming apparatus in a discharging direction; and a hollow shaft and a rotating shaft both disposed on the discharging unit, the rotating shaft inserted into the hollow shaft, and the hollow shaft rotating with the rotating shaft about an axial axis perpendicular to the feeding path to discharge a sheet, moving along the axial axis, contacting the sheet fed through the feeding path to change the discharging direction of the sheet to a direction oblique to the discharging direction when the hollow shaft moves along the axial axis.

41. The device of claim 40, wherein the oblique direction is oblique at a positive angle or at a negative angle to the feeding path while the discharging direction is parallel to the feeding path.

42. The device of claim 40, wherein the hollow shaft discharges sheets in a zigzag fashion by discharging the sheet in the discharging direction and the oblique direction.

43. A method in a paper discharging device of an image forming apparatus, the method comprising:

rotating a rotary shaft;

rotating a hollow shaft inserted around the rotary shaft;

moving the hollow shaft along an axial axis of the rotary shaft in a first position and a second position; and discharging sheets in a first direction and a second direction when the hollow shaft moves along the axial axis of the rotary shaft.

44. The method of claim 43, wherein the discharging of the sheets comprises discharging the sheets in zigzag fashion.

45. The method of claim 43, wherein the hollow shaft simultaneously rotates and moves along the axial axis of the rotary shaft between the first position and the second position.

46. The method of claim 43, further comprising selectively transmitting a rotation power of the rotary shaft to the hollow shaft to reciprocate the hollow shaft between the first position and the second position.

47. The method of claim 43, wherein the hollow shaft moves along the axial axis of the rotary shaft when each of the sheets is fed past the hollow shaft.

48. The method of claim 43, wherein the hollow shaft moves along the axial axis of the rotary shaft when each of the sheets is not fed past the hollow shaft.

* * * * *

UNITED STATES PATENT AND TRADEMARK OFFICE

CERTIFICATE OF CORRECTION

PATENT NO. : 6,799,013 B2
DATED : September 28, 2004
INVENTOR(S) : Hwa-sung Shin It is certified that error appears in the above-identified patent and that said Letters Patent is hereby corrected as shown below:

Column 6,
Line 48, change "f" to -- of --,
Line 49, change "a end" to -- an end --,
Line 55, insert -- a -- before "pair".

Signed and Sealed this

First Day of February, 2005

JON W. DUDAS
*Director of the United States Patent and Trademark Office*